United States Patent
Beck et al.

(10) Patent No.: US 6,790,302 B2
(45) Date of Patent: Sep. 14, 2004

(54) ADHESIVE MEANS FOR CONNECTING A WEB END ON A MATERIAL ROLL AND CORRESPONDING METHOD

(75) Inventors: Peter Franz Beck, Karlstadt (DE); Andreas Bruno Rösch, Karlstadt (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 10/474,040

(22) PCT Filed: Mar. 26, 2002

(86) PCT No.: PCT/DE02/01090

§ 371 (c)(1),
(2), (4) Date: Mar. 1, 2004

(87) PCT Pub. No.: WO02/083532

PCT Pub. Date: Oct. 24, 2002

(65) Prior Publication Data

US 2004/0134591 A1 Jul. 15, 2004

(30) Foreign Application Priority Data

Apr. 12, 2001 (DE) .......................... 101 18 362

(51) Int. Cl.$^7$ .............................. B65H 19/18; C09J 7/02
(52) U.S. Cl. ....................... 156/159; 156/157; 156/504; 242/553; 242/555.3; 242/556.1; 428/41.7; 428/41.8; 428/354
(58) Field of Search ................................. 156/157, 159, 156/187, 256, 502, 504; 242/551, 553, 555.3, 555.4, 556.1; 428/41.7, 41.8, 57, 343, 354

(56) References Cited

U.S. PATENT DOCUMENTS

| | | | | |
|---|---|---|---|---|
| 2,149,832 A | * | 3/1939 | Bernard | 242/556.1 |
| 5,212,002 A | * | 5/1993 | Madrzak et al. | 428/41.9 |
| 5,348,793 A | | 9/1994 | Stettner | |
| 5,996,927 A | * | 12/1999 | Weirauch et al. | 242/556.1 |
| 6,264,132 B1 | | 7/2001 | Menz et al. | |
| 6,416,604 B1 | | 7/2002 | Nootbaar et al. | |
| 6,432,241 B1 | * | 8/2002 | Congard et al. | 156/157 |
| 6,595,461 B1 | * | 7/2003 | Storbeck et al. | 242/556.1 |
| 6,637,697 B1 | * | 10/2003 | Wienberg | 428/343 |

FOREIGN PATENT DOCUMENTS

| | | |
|---|---|---|
| DE | 40 33 900 A1 | 10/1991 |
| DE | 43 39 309 A1 | 7/1994 |
| DE | 296 21 879 U1 | 4/1997 |
| DE | 198 30 673 A1 | 1/2000 |
| DE | 198 30 674 A1 | 1/2000 |
| EP | 0 566 880 A1 | 10/1993 |
| EP | 0 970 904 A1 | 1/2000 |
| EP | 0 970 905 A1 | 1/2000 |
| WO | WO 98/52857 | 11/1998 |
| WO | WO 03/24850 A1 | 3/2003 |

* cited by examiner

Primary Examiner—Mark A. Osele
(74) Attorney, Agent, or Firm—Jones Tullar & Cooper, PC

(57) ABSTRACT

An adhesive strip is usable to prepare a material roll for a flying roll change. A support strip has at least one adhesive layer or stripe on its upper surface. A further adhesive zone is provided on the undersurface of the support strip. The adhesive zone includes at least two adhesive layers which are separated from each other by a backing paper. An additional separate adhesive strip is also placed on the undersurface of the support strip, spaced from the adhesive zone and without a backing paper.

12 Claims, 1 Drawing Sheet

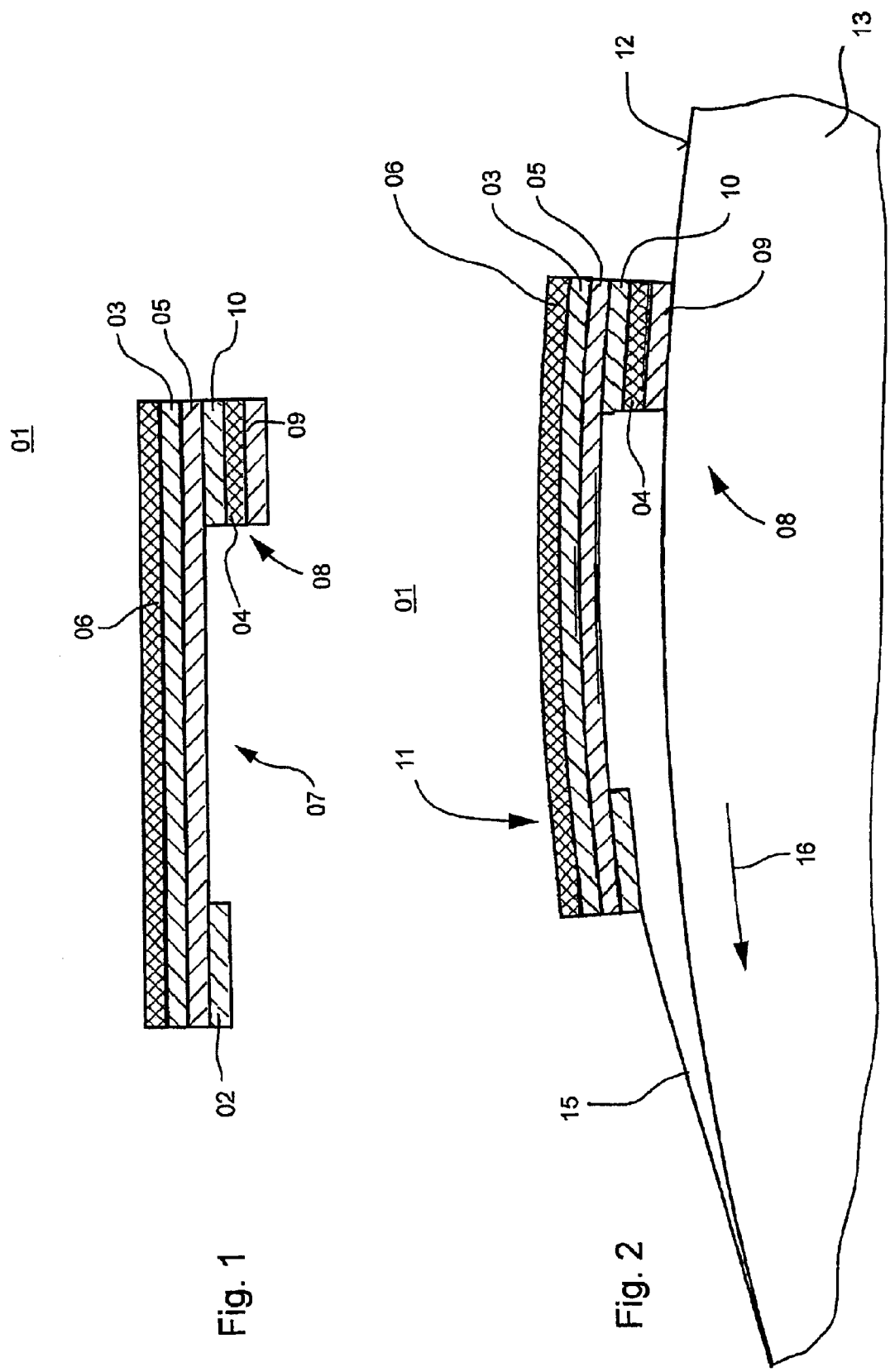

ADHESIVE MEANS FOR CONNECTING A WEB END ON A MATERIAL ROLL AND CORRESPONDING METHOD

FIELD OF THE INVENTION

The present invention is directed to an adhesive tape adapted for use in connecting a web starting end of a roll of material and to a method of its use. The adhesive tape is intended for use for preparing a roll of material for a flying roll change.

BACKGROUND OF THE INVENTION

EP 1 022 245 A2 discloses an adhesive for use in a flying roll change. An adhesive location exhibits a separable capability.

DE 198 30 674 A1 discloses an adhesive for use in a flying roll change. Two edge regions of an adhesive location each exhibit a separable capability.

WO 98152857 discloses a method for adhesive location during preparation of a material web. This publication also discloses various devices for performing the disclosed method. In this prior method, the web starting end of the new paper web is gripped and is conducted in paper guide devices. An adhesive assembly which may be, for example, adhesive labels, can be placed extending beyond the cut edge of the web starting end on the outer side, of the web starting end. The paper web is then wound back onto the paper roll, so that the adhesive, which was protruding beyond the cut edge, can come to rest on the periphery of the paper roll and in this way can fix the web starting end on the periphery. The result of this prior method of adhesive location preparation of a paper roll is, therefore, that the adhesive covers the cut edge of the web starting end.

DE 43 39 309 A1, DE 296 21 879 U1 and DE 198 30 673 A1 all describe adhesive assemblies Intended for use in preparing a roll of material for a flying roll change. A support band is connected with the upper side of the web starting end by the provision of an adhesive zone. Another adhesive zone of the support band is connected with the second material ply of the roll. The outer side of the support band is also connected with the old web.

In the case of the adhesive strips disclosed in DE 40 33 900 A1, a separating of the adhesive strips occurs between an adhesive zone of a support band and an adhesive strip. A splitting between the adhesive location arranged on the second ply between two adhesive strips is not accomplished in this document.

SUMMARY OF THE INVENTION

An object of the present invention is to provide an adhesive tape for use in connecting a web starting end of a roll of material, and to a method of its use.

The object of the present invention is achieved by the provision of an adhesive tape which includes a support band. At least one adhesive strip is arranged on an upper surface of this support band. An adhesive zone is provided on one portion of the undersurface of the support band and includes at least two adhesive strips which are separated from each other by a release film. Another area of the undersurface of the support band has a separate adhesive strip which does not have a release film. The lower adhesive strip in the adhesive zone is connected to the underlying web layer on the new roll while the spaced, separate adhesive strip, without the release sheet or film, is connected to the upper side of the roll's uppermost web.

An advantage of the adhesive tape in with the present invention lies particularly in that the adhesive for fixing the web starting end on the periphery of the new roll of material covers the cut edge from above, so that it is easy to apply.

The separating of the two adhesive strips, in their connection zone, forms a defined separable location without having to cut or to tear parts. During the withdrawing of the web starting end from the periphery of the new roll of material during the adhering of the new web starting end to the old material web during a flying roll change, the adhesive used for fixing the web starting end to the underlying web layer on the new roll do not have to be separated through, for example, a perforation in the adhesive zone which would otherwise have to be provided. Instead, the web starting end can simply be withdrawn from the periphery of the new roll of material. The withdrawal force only has to be at least sufficient to overcome the holding strength of the adhesive tape between the periphery of the new roll of material and the web starting end. This method of web end withdrawal is especially advantageous, when an adhesive in the form of, for example an adhesive tape, is used, which adhesive can be split along the plane of its body. In withdrawing the web starting end, the adhesive tape in accordance with the present invention then splits in the dividing plane, so that one part is drawn in with the web starting end and the other part remains on the web periphery. No separate labels are needed, so that a continuous adhesion is possible.

BRIEF DESCRIPTION OF THE DRAWINGS

A preferred embodiment of the adhesive tape in accordance with the present invention is illustrated in the drawings and is described below in greater detail.

The drawings show as follows: in

FIG. 1 a cross sectional view of an adhesive tape in accordance with the present invention for use in the adhesive location preparation of a roll of material; and in FIG. 2 a schematic side view of a processing phase during the adhesive location preparation.

DESCRIPTION OF THE PREFERRED EMBODIMENT

To perform the method for connecting a web starting end to a roll in accordance with the present invention, an adhesive assembly 01, in the form of an adhesive tape 01 can be used. Such an adhesive tape 01 is shown schematically in cross section in FIG. 1.

The adhesive tape, generally at 01 includes a support band or strip 05, which,gives mechanical strength to the adhesive tape 01 and in which, pulling forces can be transmitted.

On an upper side of support band 05 there is provided an upper adhesive strip 03. This upper adhesive strip 03 is preferably formed by the application of a corresponding adhesive material on the support band 05. The upper adhesive strip 03 is protected by a suitable cover strip 06, which is removable.

On an underside of support band 05 there is located a lower adhesive strip 02, which is generally similar to the upper adhesive strip 03 but which contacts the underside of support band 05 only over a portion of surface band 05's underside. There is also provided an additional, separate adhesive zone 08. This adhesive zone 08 has at least two stacked adhesive strips 9, 10, which are separated from one another by a splitting paper or a backing paper or release film 04. The lower adhesive strip 02 is one-ply and is formed without the interposition of a splitting paper or backing layer or release film 04 between it and the support band 05.

The two separate lower adhesive locations 02, 08, which are located on the underside of the support band 05 can be separated from one another by a spacing gap 07.

It is also within the scope of the present invention to place a plurality of the one-ply adhesive strips 02 on the underside of the support band 05, with these plurality of adhesive strips 02 being separated from one another by a plurality of the spacing gaps 07.

The use of the adhesive tape 01 in accordance with the present invention for carrying out the method of the present invention is shown schematically in FIG. 2.

As can be seen by now referring to FIG. 2, the adhesive tape 01 is applied on a web starting end 11, and on a web starting periphery 12, which is a second material web ply 12 that underlies the material web top layer 15 which includes the web starting end 11, manually or by use of suitable mechanical gripping elements. The web starting end 11 is the free end of the top layer 15 of the material web which forms a new material roll 13, which is typically a paper roll 13 that will be used in a flying roll change.

The web starting end 11 of the uppermost or top layer 15 of the material web is laid out flush on a working table, which is not specifically shown, and the web starting end 11 is cut to form an exact, cut edge which is either parallel with or is inclined to the rotational axis of the material roll 13. In this connection, the adhesive tape 01 is fixed on the web starting end 11 by congruent placement of the first, lower adhesive strip 02 along the cut edge on the web starting end 11. The second or upper adhesive strip 03 is still covered with covering strip 06 in this phase of the process.

After securement of the adhesive tape on the web starting end 11 of the material web 15, e.g. of a paper web 15, the material roll 13 is rewound in the direction of the motion arrow 16, as seen in FIG. 2.

As the material roll 13 is rewound, the web starting end 11 and the adhesive tape 01 are pressed against the periphery 12 of the material roll 13 by a pressure element, which is not specifically shown, but which is typically formed in the manner of a paper lead, or guide, roller. The adhesive tape 01 extends, with its adhesive zone 08, into the area of the periphery 12 of the new material roll 13, so that, upon the contact of the adhesive zone 08 with the periphery 12, the web start end becomes fixed on the periphery 12. Then, the cover strip 06 is removed from the upper adhesive strip 03. With that cover strip 06 removal, the adhesive location on the new material roll 13 is now completely prepared.

Following mounting of the new material roll 13 in a roll changer, which is not specifically shown, pressing of the upper adhesive strip 03 against another material web connects the start end 11 of the new material roll 13 with the material web to be replaced.

Upon the subsequent pulling of the web start end 11 from the periphery of the new material roll 13, as the upper adhesive strip 03 is brought into contact with the expiring material web, the adhesive zone 08 splits along the splitting paper or release film 04 situated between the two adhesive strips 09 and 10, so that, after fixing of the adhesive zone 08 on the material web 12, the adhesive tape 01 gets divided by splitting between the adhesive layers 09 and 10.

While a preferred embodiment of an adhesive tape and its method of use, in accordance with the present invention, has been set forth fully and completely hereinabove, it will be apparent to one of skill in the art that various changes in, for example, the specific adhesives used, the type of release film or backing paper used and the like could be made without departing from the true spirit and scope of the present invention which is accordingly to be limited only by the following claims.

What is claimed is:

1. An adhesive tape adapted for use for preparing a roll of material for a flying roll change, said adhesive tape comprising:
    a support band having an upper surface and a lower surface;
    at least one upper adhesive strip on said support band upper surface;
    an adhesive zone on said lower surface of said support band, said adhesive zone including at least first and second adhesive layers separated apart from each other by a release film; and
    a lower adhesive strip on said lower surface of said support band, said lower adhesive strip being spaced from said adhesive zone by a spacing gap.

2. The adhesive tape of claim 1 wherein said lower adhesive strip is one ply.

3. The adhesive tape of claim 1 further including a plurality of said lower adhesive strips each separated by said gap from said adhesive zone.

4. A method of connecting a web start end of a first layer of a material web wound as a material roll to a second layer of said material web including:
    providing a support band having an upper surface and a lower surface;
    arranging at least one upper adhesive strip on said support band upper surface;
    providing an adhesive zone on said lower surface of said support band;
    forming said adhesive zone having at least first and second adhesive layers;
    separating said at least first and second adhesive zones from each other by a release film;
    providing a lower adhesive strip on said lower surface of said support band;
    spacing said lower adhesive strip from said adhesive zone by a spacing gap;
    connecting said adhesive zone to said second layer of said material web; and
    connecting said lower adhesive strip to said web start end of said first layer of said material web strand.

5. The method of claim 4 further including providing a second material web and connecting said web start end of said material web to said second material web by contacting said second material web with said at least one upper adhesive strip.

6. The method of claim 4 further including cutting said web start end of said first layer of said material web strand prior to connecting said lower adhesive strip to said web start end of said first layer of said material web strand.

7. The method of claim 6 further including forming an exact cut edge during said cutting of said web start end and orienting said exact cut edge selectively parallel with and inclined with respect to an axis of rotation of said material roll.

8. The method of claim 4 further including connecting said lower adhesive strip to said web start before connecting said adhesive zone to said second layer of said material web.

9. The method of claim 4 further including providing a pressing element and using said pressing element for pressing said web start against said second layer of said material web.

10. The method of claim 4 further including placing said web start end flat before connecting said lower adhesive strip to said web start end.

11. The method of claim 10 further including providing a table and placing said web start end on said table.

12. The method of claim 4 further including connecting said web start end to said second layer of said material web.

* * * * *